United States Patent [19]

Waite et al.

[11] Patent Number: 5,328,677
[45] Date of Patent: Jul. 12, 1994

[54] RECOVERY OF SULFIDES FROM TANNERY WASTE LIQUOR

[75] Inventors: Richard G. Waite, Shorewood; Paul R. Erickson, Glendale, both of Wis.

[73] Assignee: PVL Limited Partnership I, Milwaukee, Wis.

[21] Appl. No.: 900,055

[22] Filed: Jun. 17, 1992

[51] Int. Cl.$^5$ .................. C01B 17/32; C01B 17/22; C14C 1/08; C02F 1/20
[52] U.S. Cl. .................. 423/560; 423/563; 423/566.2; 422/237; 8/94.17; 210/150; 210/188; 210/718; 210/705; 210/750; 210/752; 210/905
[58] Field of Search ............... 423/229, 273, 560, 563, 423/566.2, DIG. 3; 8/94.15, 94.16, 94.17, 94.18; 210/143, 150, 151, 188, 705, 718, 750, 752, 905, 926; 422/237

[56] References Cited

U.S. PATENT DOCUMENTS

| | | | |
|---|---|---|---|
| 2,002,654 | 5/1935 | Bierbaum | 423/563 |
| 3,211,148 | 10/1965 | Galajda et al. | 261/92 |
| 3,297,043 | 1/1967 | Adams | 422/273 |
| 3,761,059 | 9/1973 | Ruthert et al. | 261/92 |
| 4,085,044 | 8/1978 | Komanowsky et al. | 210/905 |
| 4,457,759 | 7/1984 | Fekete et al. | 8/94.16 |
| 4,789,469 | 12/1988 | Cuitas et al. | 261/92 |
| 4,842,920 | 6/1989 | Banai et al. | 210/150 |
| 4,975,197 | 12/1990 | Wittmann et al. | 210/926 |
| 5,149,295 | 9/1992 | Bowling et al. | 8/94.18 |

Primary Examiner—Gary P. Straub
Attorney, Agent, or Firm—Andrus, Sceales, Starke & Sawall

[57] ABSTRACT

An apparatus and process for the removal and recovery of sulfides from tannery waste water or liquor. The apparatus comprises a closed vessel, the sulfide-bearing liquor is introduced into a first or acidulation zone of the vessel and mixed with acid to decrease the pH, preferably to a value below 4.0, and generate hydrogen sulfide. The acidified liquor is then overflowed into a second or desorption zone of the vessel and slowly agitated and conveyed through the second zone by disc conveyors to release the hydrogen sulfide gas from the liquor. A slight vacuum is drawn on the vessel causing the released hydrogen sulfide gas to be drawn into a third reaction zone of the vessel, where the gas combines with sodium hydroxide solution to form sodium sulfhydrate. The effluent from the second zone can be filtered or dewatered and the filtrate discharged to a disposal site while the proteinaceous solids can be recovered for use as fertilizer. The sodium sulfhydrate produced in the third zone can be used in the unhairing operation of the tanning process.

22 Claims, 3 Drawing Sheets

RECOVERY OF SULFIDES FROM TANNERY WASTE LIQUOR

BACKGROUND OF THE INVENTION

In the conversion of hides into leather an initial step is the separation of hair and epidermis from the skin or dermis, which ultimately becomes the leather. Under buffered alkaline conditions imposed by hydrated lime, dissolved sodium sulfide preferentially breaks down the hair and epidermal proteins without adversely affecting the collagens or skin protein. After the degradation process, the hair, along with the lime/sulfide liquor, is removed from the hides for disposal by washing methods.

The alkaline depilatory liquor normally contains a considerable excess of lime and has a pH of at least 12.5. The lime performs multiple functions in that the alkalinity causes the fiber bundles in the hide matrix to swell and open up, and catalyzes the depilatory reaction between the protein and the sulfides.

The disposal of the spent unhairing and liming liquor has been an ongoing problem for tanneries. It has been recognized that if the pH of the liquor is reduced much below 10.0, hydrogen sulfide gas will be stripped or released from the liquor. The development of hydrogen sulfide gas has the potential to result in increased toxicity, corrosivity and obnoxious odors. Further, a decrease in pH of the liquor by virtue of mixing with acidic components in the sewer may give rise to the emission of hydrogen sulfide, which in turn poses a potential health hazard to sewer workers and may accelerate the deterioration of sewer lines and sewer treatment equipment.

Various methods have been attempted in the past to remove sulfides from tannery waste liquor. One of the oldest techniques is chemical treatment by ferrous sulfate, which results in the precipitation of iron sulfide and iron hydroxide. The precipitation of iron hydroxide also causes a lowering of the pH and a partial precipitation of protein present in the liquor. This process has several major disadvantages, including the high volume of sludge produced for the sulfide is merely precipitated as a sludge and is not converted to a less hazardous form, or recaptured for reuse.

Catalytic oxidation has also been employed to remove sulfides from tannery waste liquor. This method consists of injecting air into the spent liquor in the presence of a suitable catalyst, such as manganese sulfate in the ratio of 1 part manganese to 10 to 20 parts sulfide. The sodium sulfide present in the liquor is oxidized primarily to thiosulfate and in smaller quantities to sodium sulfate. While the catalytic oxidation process is effective in removing sulfide, it requires the use of a heavy metal catalyst with a potentially negative environmental impact.

A further method used in the past for removing sulfides is an air stripping system, whereby the liquor is initially fed to a clarifier which is an essential part of the recovery system and serves to remove larger solids, that might interfere with operation of the de-gasifier tower. After passing through the clarifier the liquor is pumped to the degasifier tower wherein the liquor is acidified and air is passed in countercurrent flow to the liquor to air strip the hydrogen sulfide gas released from the liquor. The typical degasifier tower consists of a series of vertically spaced trays, and the liquor is pumped into the top tray and flows downward, while air is bubbled up through each tray and exits from the top of the degasifier tower. In addition, the typical stripping system includes an overflow tower which is connected to the de-gasifier tower and serves to maintain pressure in the degasifier tower. From the degasifier tower, the hydrogen sulfide gas is passed to an absorption tower where the gas passes in countercurrent flow to a sodium hydroxide solution which reacts with the hydrogen sulfide to form sodium sulfhydrate and/or sodium sulfide. As the typical stripping system requires a clarifier, a degasifier tower, an overflow tower, and an absorption tower, as well as a pumping mechanism, the capital cost of the typical stripping system is substantial.

Further, the typical air stripping systems, as used in the past, have had distinct shortcomings. More particularly, the degasifier trays in the degasifier tower become clogged with proteins that precipitate during acidification of the liquor causing substantial downtime for cleaning. In addition, control of the air flow through the degasifying tower is critical to ensure that the hydrogen sulfide concentration enroute to the absorbing tower remains below the explosive limit of hydrogen sulfide in air.

Air stripping has the further disadvantage of removing other volatiles from the unhairing liquors. These impurities have been reported to impede the depilatory effectiveness of the recovered liquors. Some oxidation of the sulfides may also take place.

SUMMARY OF THE INVENTION

The invention is directed to an improved stripping system for the removal and recovery of sulfides from tannery waste water or liquor. The apparatus is comprised of a single closed vessel. The sulfide-bearing liquor is introduced into a first or acidulation zone of the vessel and mixed with an acid to decrease the pH to a value below 5.5 and preferably below 4.0 to maximinize the conversion of sulfides to hydrogen sulfide. The acidified liquor is then overflowed from the first zone to a second or desorption/degassing zone of the vessel and slowly agitated and conveyed through the second zone by a plurality of disc conveyors. As the acidified liquor is conveyed through the second zone, the proteinaceous materials are coagulated to form a relatively homogenous slurry from which hydrogen sulfide gas is released as dynamic equilibria shift to favor degasification.

At the downstream end of the second zone, the liquid slurry overflows into a discharge outlet and is subsequently dewatered. The resulting sludge cake, having a high concentration of proteins, can be used for the production of other products, such as animal feed or fertilizer.

A slight vacuum is drawn on the vessel to expedite the diffusion of the desorbed hydrogen sulfide gas into a third or reaction zone. The third zone consists of a plurality of absorption stages where the gas combines with aqueous sodium hydroxide solution to form sodium sulfhydrate and/or sodium sulfide which ultimately will be reused in the depilatory portion of the leather making process. The first absorption stage consists of an open trough through which the caustic/sulfidic solution flows as it returns to the recirculation reservoir for recycling back to the second absorption stage. The trough contains a series of rotating disc conveyors which continuously cycle through the gaseous and liquid phases, thus promoting reaction of the hydrogen sulfide gas with the caustic/sulfidic solution while also imparting transport motion to the liquid in the trough. The trough contains a weir which assures that the conveyor discs will rotate half submerged and carry a thin film of caustic up and into the zone containing the maximum concentration of effervescing hydrogen sulfide. The second recovery stage located above the trough/disc assembly consists of an absorption column packed with inert material that provides increased surface contact between the gaseous and liquid phases. The caustic/sulfidic solution from the reservoir is sprayed over the inert material in a countercurrent fashion to the flow of hydrogen sulfide gas and reacts with the gas by means of this intimate contact. The caustic/sulfidic solution exits the second stage and continues through the first stage as described previously on its way to the reservoir. At the appropriate time the caustic solution fortified with the recovered sulfides is withdrawn from the reservoir, and reused as a portion of the sulfide requirement in the unhairing process. The system is recharged with fresh caustic solution and the process is repeated.

The disc conveyors as used in both the second and third zones of the apparatus perform a multiplicity of functions. In the second or desorption zone, the disc conveyors promote agitation of the acidified liquor to eliminate premature sedimentation of precipitated proteins, and also destabilize hydrogen sulfide solubility in the acidified liquor. In addition, the disc conveyors in the second zone serve as a mass transfer media, in that the upper portion of the discs rotate out of the acidified liquor and act as thin film transfer interfaces between the aqueous and gaseous hydrogen sulfide phases. The disc conveyors also impart turbulent motion to the gaseous phase.

In the third reaction zone, the disc conveyors agitate the alkaline absorption liquor to maximize solubility, increase turbulence, and stimulate absorption and reaction of hydrogen sulfide with the caustic solution in the trough. As in the case of the disc conveyors in the second zone, the disc conveyors in the third zone serve as mass transfer media, in which the upper portions of the discs that rotate out of the alkaline absorption liquor act as thin film transfer interfaces that absorb gaseous hydrogen sulfide, thereby reducing the vapor pressure and pushing the equilibrium toward absorption.

The invention provides a compact and relatively inexpensive mechanism for converting sulfides in tannery waste liquor to sodium sulfhydrate, which can then be reused in the unhairing operation.

As the stripping of hydrogen sulfide gas and the absorption and conversion to sodium sulfhydrate and/or sodium sulfide occurs in a single closed vessel, there is no emission of hydrogen sulfide gas to the atmosphere, nor is there any need for corrosion resistant pumping or conveying equipment for hydrogen sulfide gas as has been used in stripping systems of the past.

In prior stripping systems, the released hydrogen sulfide gas was stripped from the liquor by air flow and conveyed to the absorption tower by the air stream. The prior system thus required an air blower, an overflow tower having a liquid trap to maintain air pressure in the degasifier tower, as well as extensive air flow controls to ensure that the hydrogen sulfide concentration enroute to the absorption tower remained below the lower explosive limit of hydrogen sulfide in air. As the system of the invention does not use air flow, these components are not required in the system.

Other objects and advantages will appear in the course of the following description.

DESCRIPTION OF THE DRAWINGS

The drawings illustrate the best mode presently contemplated of carrying out the invention.

In the drawings:

FIG. 4 is a section taken along line 4—4 of FIG. 1;

DESCRIPTION OF THE ILLUSTRATED EMBODIMENT

The drawings illustrate an apparatus for removing and recovering sulfides from waste tannery liquor. In the normal operation of the tannery, the hides are contacted with a liquor consisting of water and dissolved sodium sulfide, along with sparingly soluble hydrated lime. In general, the sulfide content of the liquor ranges from 2000 to about 6,000 ppm and contains an excess of lime, so that the liquor has a pH of at least 12.5.

The alkalinity in the liquor causes the fibrous bundles in the hide matrix to swell and open up while the sulfide preferentially breaks down the hair and epidermal proteins without affecting the collagen or skin proteins, thus resulting in removal of the hair from the hide.

Upon completion of the chemical dissolution of the hair the waste liquor is delivered to the apparatus of the invention, which includes a closed vessel 1 that defines a mixing or acidulation zone 2, a hydrogen sulfide gas release zone 3, and an absorption reaction zone 4.

Figure 3:
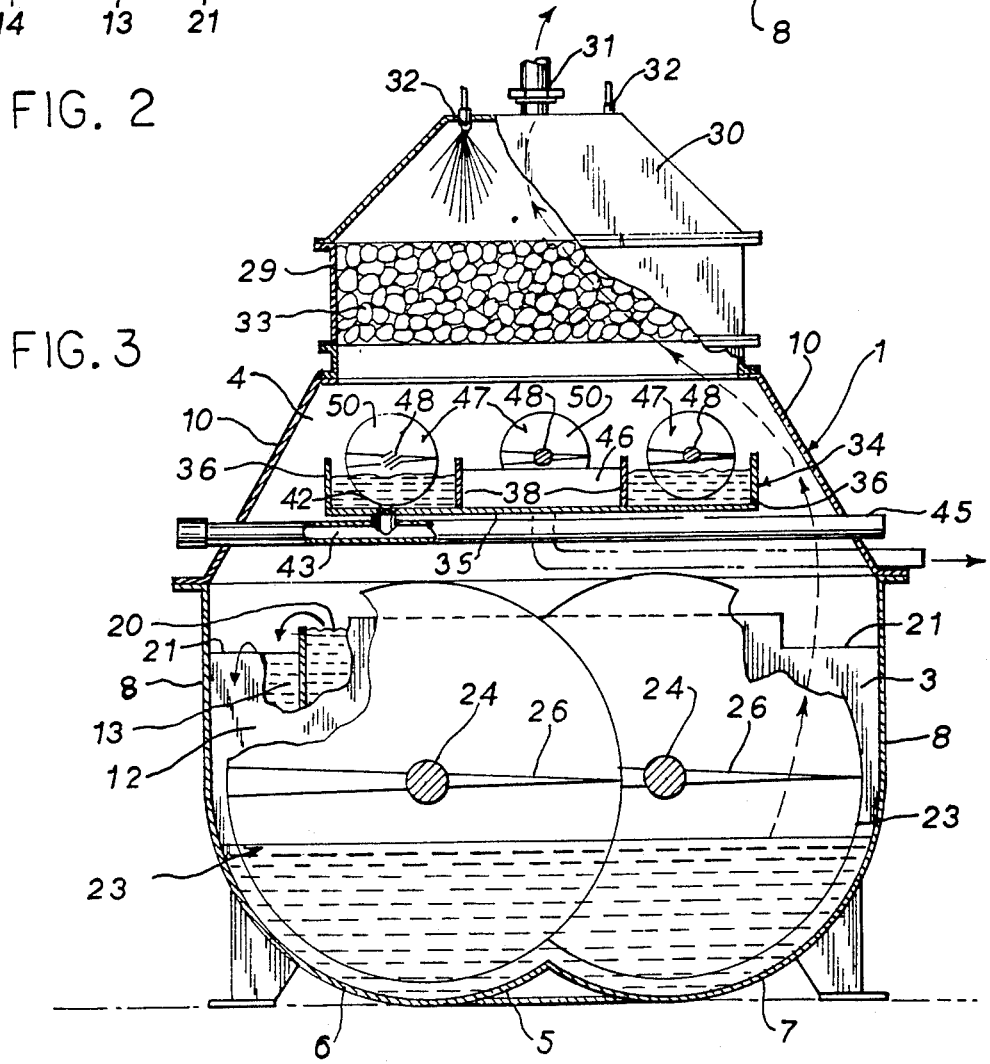
FIG. 3 is a vertical section taken along line 3—3 of FIG. 1 and showing the collection tray.

Vessel 1 is composed of a bottom wall 5, which as best illustrated in FIG. 3 includes a pair of curved sections 6 and 7 joined together along a central longitudinal ridge. Bottom wall 5 is joined to a pair of side walls 8 and a pair of end walls 9. Diagonal upper walls 10 extend upwardly from side walls 8 and the upper edges of diagonal walls 10 are connected by a horizontal top wall 11.

Figure 1:
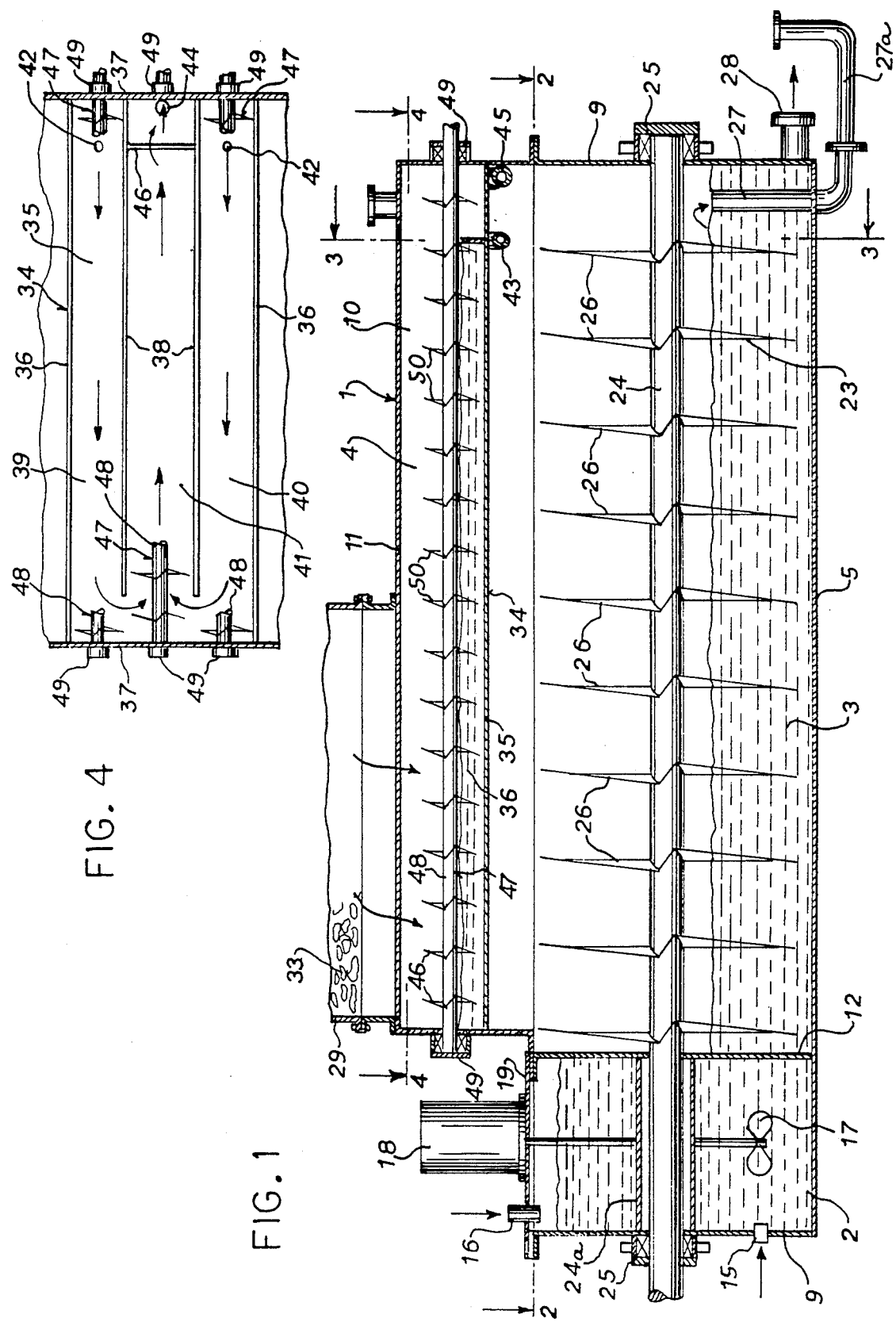
FIG. 1 is a longitudinal section of the sulfide removal and recovery apparatus of the invention.

As shown in FIG. 1, vessel 1 also includes an internal wall 12 which is parallel to one of the end walls 9, and a pair of walls 13, each of which is spaced inwardly from the corresponding side wall 8 to provide a pair of compartments or chambers 14 which are located outwardly of the mixing zone 2. Thus, mixing zone 2 is defined by one of the end walls 9, wall 12, walls 13 and bottom wall 5.

The waste liquor from the unhairing process is introduced into the mixing zone 2 through an inlet 15 located in the lower portion of end wall 9, while a mineral acid, such as sulfuric acid, is fed into the upper end of mixing zone 2 through an inlet 16. The acid is added above the liquid level in the zone 2 as opposed to a positive pressure feed, i.e. submerged inlet feed pipe. This ensures that acid will not flow upstream and enter the raw liquor chamber and flash off hydrogen sulfide accidentally. The acid is added in an amount to reduce the pH of the liquor to a value below 5.5 and preferably below 4.0. The acid reacts with the sulfide to generate hydrogen sulfide.

An agitator or mixer 17 is located in the mixing zone 2 and is driven by a motor 18 mounted on the top wall 19. Agitator 17 serves to thoroughly mix the acid with the liquor in the mixing zone or chamber 2.

As shown in FIG. 3, the upper edges 20 of walls 13 are spaced from the top wall 19 and provide weirs over which the liquor overflows into the chambers 14. The waste liquor, as well as the acid, are continuously fed to the mixing zone 2 and thus there is a continuous overflow of liquor over the top edges of walls 13 to the chambers 14.

Figure 2:
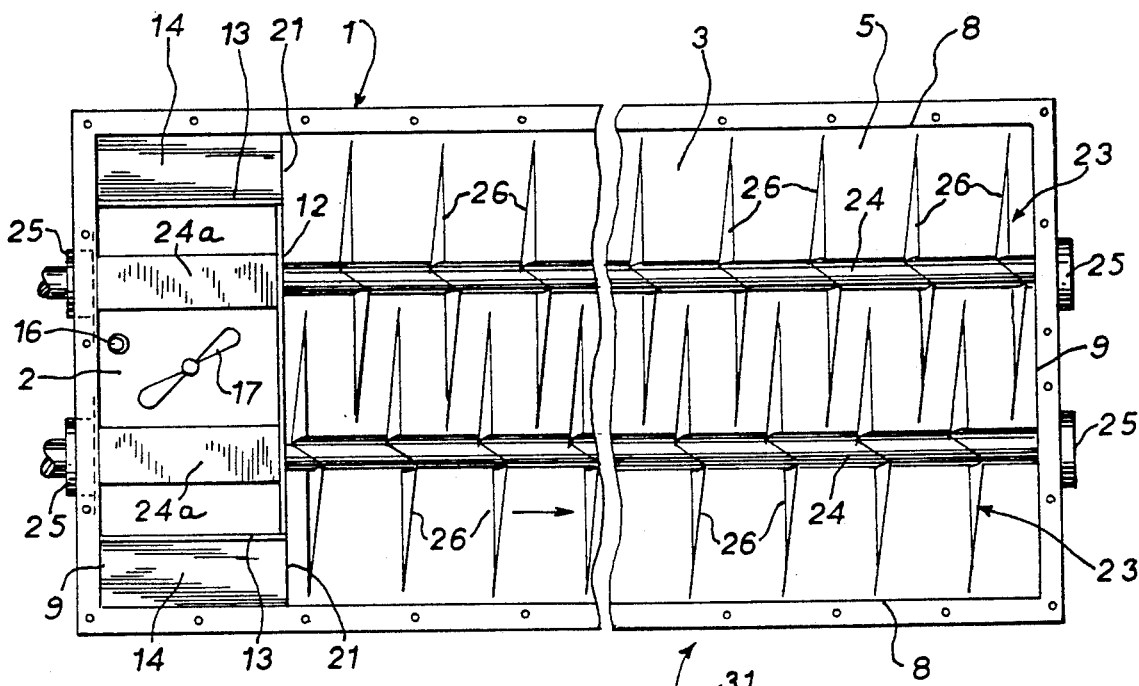
FIG. 2 is a horizontal section taken along line 2—2 of FIG. 1.

As seen in FIG. 2 and 3, internal wall 12 is provided with a pair of horizontal edges or weirs 21. The liquor in each chamber 14 overflows the edges 21 and passes into the release zone 3.

In the release zone or chamber 3, the liquor is slowly conveyed or moved in a downstream direction by a pair of conveyors 23. Each conveyor 23 includes a horizontal shaft 24, the ends of which are journaled in bearings 25 mounted in end walls 9. Each shaft carries a series of separate conveyor discs 26 and the discs 26 of one conveyor are staggered or interdigitated with the discs of the adjacent conveyor. A variable speed drive mechanism located outside vessel 1, and not shown, can be operably connected to the corresponding ends of shafts 24 to rotate the conveyors in a manner to move the liquor in a downstream direction within the release zone 3. In practice, the conveyors are rotated at a speed less than 60 rpm, and preferably less than 40 rpm. The feed rate of the waste liquor is such that it will provide a D residence time in the release chamber 3 of at least 20 minutes. During this residence time, the proteinaceous materials in the liquor are precipitated to a generally homogeneous coagulated state and hydrogen sulfide gas is released from the waste liquor and reabsorbed into the alkaline liquor. Oil and grease in the liquor are adsorbed onto the proteinaceous precipitate.

The portions of shaft 24 extending through mixing zone 2 are sheathed in housings 24a, as illustrated in FIGS. 1 and 21, to prevent the acidified liquor from contacting the shafts.

Located at the downstream end of the release zone 3 is a standpipe 27 through which the liquor will overflow for further treatment, such as separation by filtration or dewatering, or disposal. By maintaining the pH of the liquor at a value below 4.0, a clean separation between the filtrate and the amorphous protein material is achieved during the filtration or dewatering process. The resulting dewatered solids can be used in a variety of other processes such as producing animal feed, organic farming, or the like, while the filtrate can be discharged to the sewer. The upper end of standpipe 27 is located beneath the level of shafts 24, so that the liquor in the release zone 3 will not contact shafts 24 or bearings 25. Standpipe 27 is connected externally to trap 27a to avoid any release of hydrogen sulfide gas with the reactor effluent.

A clean-out port 28 is provided in the lower end of end wall 9, and can be utilized to drain liquid from the vessel during cleaning procedures.

A generally rectangular housing 29 extends upwardly from the vessel 1, bordering an opening in top wall 11, and a hood 30 is mounted on the upper edge of housing 29. Located in the upper end of hood 30 is a fitting 31 which is adapted to be connected through a conduit to a vacuum pump, or other source of subatmospheric pressure. With this construction, a slight vacuum is drawn on the interior of vessel 1, causing the released hydrogen sulfide gas to diffuse upwardly into the absorption zone 4. Any release of gases from fitting 32 and the vacuum pump will be processed through additional alkaline scrubbing to assure 100% capture of $H_2S$.

Also located in the upper end of hood 30 is a pair of spray nozzles 32, which are connected through conduits, not shown, to a tank or other source of an alkali metal hydroxide solution, preferably sodium hydroxide solution. The sodium hydroxide solution is sprayed downwardly through nozzles 32 into the housing 29 which contains a bed 33 of inert three-dimensional plastic objects of the type sold under the tradename Tripack by Jaeger Products Inc. The hydrogen sulfide gas and the sodium hydroxide solution pass in countercurrent flow through the bed 33 and the mass of plastic objects in the bed increases the surface contact between the liquid and the gas to provide a more effective absorption.

Located in the absorption zone 4 is an open-top trough 34. Trough 34 is composed of a bottom wall 35 and a pair of parallel side walls 36, the ends of which are joined together by end walls 37. In addition, trough 34 includes a pair of inner walls 38, which are disposed parallel to side walls 36. Side walls 36 in combination with walls 38 define a pair of outer trough sections 39 and 40 and a central trough section 41. As best shown in FIG. 4, the inner walls 38 terminate short of one of the end walls 37 to provide communication between outer trough sections 39 and 40 and the central trough section 41.

An opening 42 is provided in one end of each outer trough section 39,40 and the openings are connected to a drain/fill conduit 43, through which sodium hydroxide solution, or other suitable alkaline solution, can be introduced into the troughs at the start-up of operation or removed when sufficiently saturated with sulfide. In addition, an outlet 44 is formed in the end of central trough section 41 and outlet 44 is connected via conduit 45 to a suitable collection sump or reservoir, so that partially adsorbed sodium sulfhydrate may be recirculated through nozzles 32 and through bed 33 and ultimately reused in the unhairing operation.

Mounted within each trough section is a conveyor 47 and each conveyor includes a central shaft 48, the ends of which are journaled within bearings 49 mounted in the end walls 37. Each shaft 48 carries a series of conveyor discs 50 which are similar in construction to discs 26. Shafts 48 are rotated by a conventional variable speed drive to move the liquid in the direction of the arrows as shown in FIG. 4. Conveyors 47 impart motion to agitate the liquor, and act as transfer media to ensure that there is complete conversion of hydrogen sulfide to sodium sulfhydrate and/or sodium sulfide.

Troughs 35, 40 and 41 also serve to collect the partially saturated sulfhydrate solution, and return it to the recirculation pump. During the serpentine travel through the troughs the liquor is pumped by the discs 50 as a thin film, with the hydrogen sulfide rich atmosphere rising from absorption zone 3.

With the invention, the hydrogen sulfide gas is wholly contained in vessel 1, thus, the likelihood of emission of hydrogen sulfide gas to the atmosphere is greatly diminished. There is no need for corrosion resistant pumping equipment or conveying equipment for hydrogen sulfide gas, as required in stripping systems of the past.

The disc conveyors 23 and 47, as used in the desorption zone 3 and absorption zone 4, respectively provide important and multiple functions. In the release zone 3, the disc conveyors 23 not only convey the liquor toward the outlet, but also promote degasification while agitating the liquor to eliminate premature sedimentation of the precipitated proteins. As the upper portions of the discs are located above the level of the acidified liquor in the desorption zone 3, the exposed portions of the discs act as film transfer interfaces between the aqueous and gaseous hydrogen sulfide phases. Further, the exposed portions of the discs impart turbulence to the released gaseous hydrogen sulfide.

In the reaction zone 4 the disc conveyors 47 also serve to convey and agitate the alkaline absorption liquor to maximize solubility of the hydrogen sulfide gas and promote absorption and reaction of the hydrogen sulfide with the sodium hydroxide solution. As is the case in the desorption zone, the exposed upper portions of the conveyor discs are located above the level of the alkaline absorption liquor and act as thin film transfer interfaces to aid in the absorption of the gaseous hydrogen sulfide and push the equilibrium toward absorption.

The apparatus of the invention is a self-contained unit in which the entire mixing, hydrogen sulfide stripping, and absorption functions are carried out in the vessel 1. Thus, the invention provides a less expensive, more secure, and more compact stripping unit than has been employed in the past.

As a further advantage, the absorption is carried out without the need of an auxiliary air stream as used in the past. Therefore, the system of the invention eliminates the need for air blowers, an overflow tower to maintain air pressure in the release or stripping zone and air flow controls to ensure that the hydrogen sulfide concentration in air remains below the lower explosive limit, as required by stripping systems as used in the past.

Figure 6:
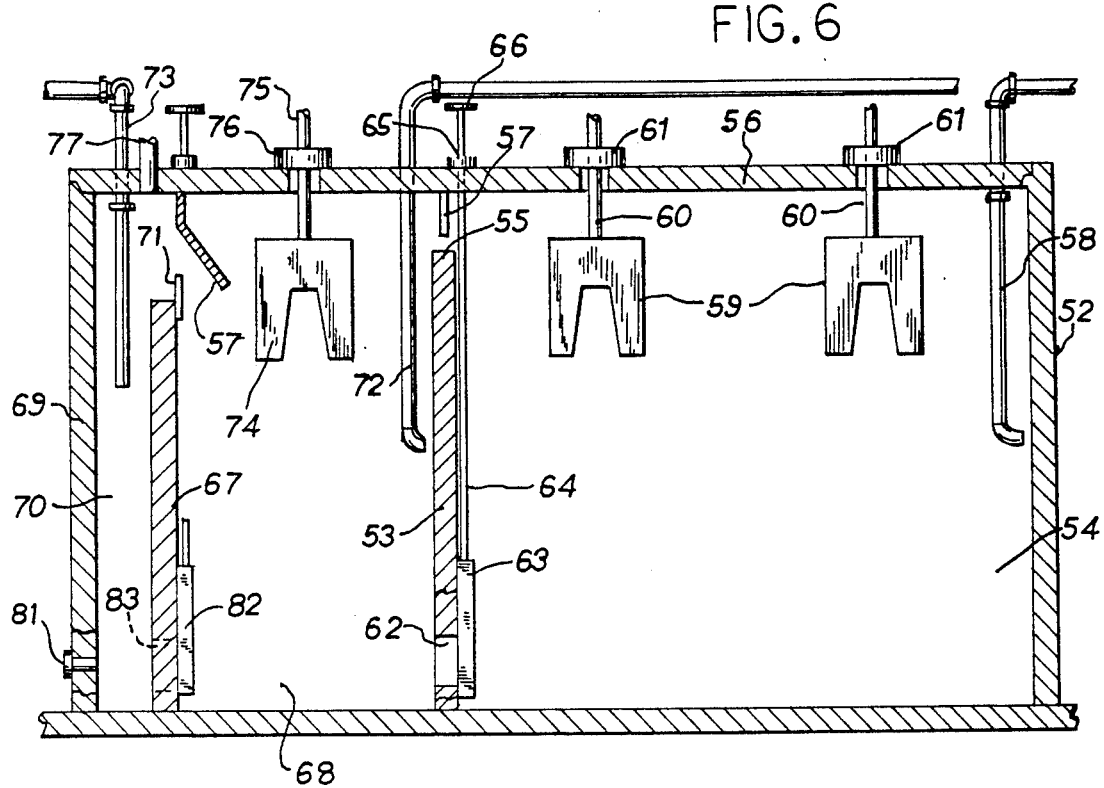
FIG. 6 is a section taken along line 6—6 of FIG. 5.
Figure 5:
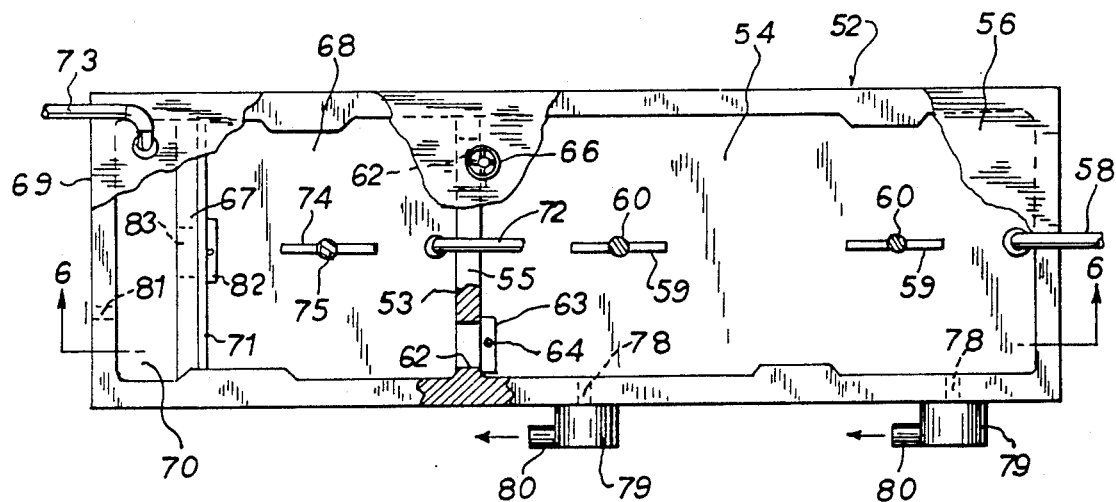
FIG. 5 is a top plan view of the pretreating collection apparatus, with parts broken away in section, that can be used in conjunction with the sulfide removal and recovering apparatus of FIGS. 1-4.

FIGS. 5 and 6 illustrate a pre-treatment collection apparatus that can be used either to supply liquor to the sulfide removal and recovery apparatus, shown in FIGS. 1-4, or alternately to oxidize the sulfides and discharge the oxidized thiosulfates, to a sewer for treatment at a local P.O.T.W.

The pretreating collection apparatus includes a generally cylindrical vessel 52 having an internal vertical wall 53, which in combination with one end of vessel 52 defines a chamber 54. The upper edge 55 of wall 53 is spaced from the top 56 of vessel 52 and forms a weir that extends across the vessel. The weir serves as an emergency overflow, if the sulfide liquor flow rate is in excess of the withdrawal rate to the sulfhydrate recovery reactors. In the event of overflow, the liquor which enters the oxidizing chamber undergoes treatment and is discharged with other oxidized liquors. One or more baffle plates 57 are suspended from top 56 of the vessel and the lower edge of baffle plate 57 is spaced from the weir 55. The baffle plate 57 serves as a splash guard.

Unhairing liquor, having a sulfide content in the neighborhood of 6,000 ppm, as well as first wash liquor, having a sulfide content of about 3,000 ppm, are introduced into chamber 54 through an inlet pipe 58. The lower end of inlet pipe 58 is formed with an elbow 58a facing wall 54, with the elbow located approximately two pipe diameters from the wall, so as to utilize the wall as a means for inlet distribution.

A pair of mixer-aerators 59 are located in the upper end of chamber 54, and are carried by vertical shafts 60. Shafts 60 extend through suitable openings in the top wall 56 and are journaled in bearings 61. The upper ends of shafts 60 are operably connected to gear reducers and electric motors, not shown. The drive units or motors are of a variable speed type, so that the mixers 59 can be rotated at different speeds in both the recovery mode and the oxidizing mode.

Located in the lower end of internal wall 53 are openings 62 which can be enclosed by slide gates 63. Each slide gate 63 is carried by a vertical rod 64 and the upper end portions of rods 64 are threaded within bushings 65 mounted on top wall 56. The upper ends of rods 64 carry hand wheels 66. Through rotation of hand wheels 66, the gates 63 can be raised and lowered to thereby open and close the openings 62. In the oxidizing mode gates 63 would be open, in the recovery mode gates 63 are closed.

A second internal wall 67 is mounted in vessel 52 in spaced relation to internal wall 53 and defines a chamber 68. Internal wall 67 is also spaced from the end wall 69 of the vessel, and the spacing between walls 67 and 69 provides a chamber 70. A weir plate 71 is mounted on the upper end of wall 67 and determines the liquid level in chamber 68 and in chamber 54 during the oxidization mode.

Reliming liquor containing approximately 1,000 ppm of sulfide is fed to the chamber 68 through an inlet pipe 72, while liquor from the recovery unit being directly discharged through outlet 27, or after sequentially passing through a filter press, is supplied to the chamber 70 through an inlet pipe 73. The liquor entering the chamber 70 is at a pH of about 4.0 and has no appreciable sulfide content.

A mixer 74, similar to mixers 59, is mounted in the upper end of chamber 68, and is carried by a vertical shaft 75 which is journaled by bearing assembly 76 in the top wall 56 of the vessel. A suitable gear reducer and electric motor, not shown, is connected to the upper end of shaft 75.

A gas vent pipe 77 is connected top wall 56 above chamber 70 and serves to vent gas to a scrubber.

A pair of outlets 78 are formed in the lower end of vessel 52 and communicate with chamber 54. Each outlet 78 is connected to the suction side of a pump 79 and the discharge outlet 80 of each pump is connected to the inlet 15 of the recovery unit. In addition, a drain outlet 81 is formed in the lower end of the vessel and communicates with chamber 70.

Outlet 81 is connected via a suitable conduit to a sewer, or other disposal site. A slide gate 82, similar in construction and operation to slide gates 63, is mounted to open and close and opening 83 in wall 67 and facilitate draining and cleaning of the entire vessel.

In the sulfide recovery mode, the gates 63 are closed, so that there is no communication between chamber 54 and chamber 68. The unhairing and first wash liquor is continuously supplied to chamber 54 through the inlet pipe 58, and the mixers 59 are slowly rotated at a speed of approximately 50 rpm to agitate and mix the liquor in chamber 54. Pumps 79 are continuously operated to discharge the liquid through the outlets 80 to the inlet 15 of the recovery unit. Suitable liquid level controls can be utilized in chamber 54 to discontinue operation of the mixers 59 in the event the liquid level in chamber 54 recedes to a location below the mixer blades, or conversely, resume operation when the liquid rises to a level where the blades can provide proper mixing.

Weir 55 permits the overflow of liquor from chamber 54 to chamber 68 in the event the amount of liquor entering the chamber 54 through inlet 58 exceeds the outflow of liquor through the outlets 78.

Thus, in the recovery mode, the unhairing and first wash liquors are collected in chamber 54 and pumped to the sulfide recovery unit, illustrated in FIGS. 1-4.

In the event the sulfide recovery unit is not operating, or in the event the supply of incoming unhairing and first wash liquor overbalances the capacity of the recovery unit, the collection apparatus shown in FIGS. 5 and 6 can be switched to an oxidizing mode in which the sulfides in the liquor are oxidized and the liquor is then discharged to the sewer.

In the oxidizing mode, and without recovery and use of the reactor illustrated in FIGS. 1-4, the gates 63 are opened, so that the incoming liquor in chamber 54 can flow through the openings 62 to chamber 68. The weir 71 maintains a constant liquid level in chambers 54 and 68.

The agitators 59 and 74 are operated at a higher rate of speed, generally about 100 rpm, which serves to agitate and aerate the liquor to oxidize the sulfide to sulfates. The oxidized liquor is continually flowed over the weir 71 into chamber 70, where it is mixed with the sulfide-free filtrate from the recovery system and the mixture is then discharged through outlet 81 to the sewer.

The baffle plates 57 serves to minimize splashing between the chambers 54 and 68 and chambers 68 and 70 during high speed operation of the mixers 59 and 74.

The pretreating apparatus shown in FIGS. 5 and can be utilized either to supply sulfide-containing liquor to the recovery unit of FIGS. 1-4, or alternately can be employed to oxidize the sulfides in situ and discharge the oxidized liquor directly to the sewer.

Various modes of carrying out the invention are contemplated as being within the scope of the following claims particularly pointing out and distinctly claiming the subject matter which is regarded as the invention.

We claim:

1. A process for treating waste sulfide liquor from a hide tanning operation, comprising the step of introducing a waste sulfide liquor containing lime into a closed vessel, adjusting the pH of the liquor in a first zone of said vessel to a value less than 5.5, discharging the liquor from said first zone to a second zone of said vessel, engaging the liquor in said second zone with a plurality of rotating conveyor discs to agitate and advance said liquor in a downstream direction in said second zone and effect release of hydrogen sulfide gas, maintaining the liquor in said second zone at a level beneath the upper extremities of said discs so that the upper portions of the discs are exposed, drawing a vacuum in said vessel to draw said hydrogen sulfide gas from said second zone to a third zone of said vessel, contacting the hydrogen sulfide gas in said third zone with an aqueous sodium hydroxide solution to form sodium sulfhydrate and/or sodium sulfide, and discharging the sodium sulfhydrate and/or sodium sulfide from said third zone.

2. The process of claim 1, wherein the step of adjusting the pH comprises adding a mineral acid to said liquor in the first zone and agitating said mineral acid and said liquor.

3. The process of claim 2, wherein said mineral acid is sulfuric acid.

4. The method of claim 1, wherein the step of maintaining the liquor at a level comprises overflowing the liquor from the second zone to a discharge side at the downstream end of said second zone.

5. The process of claim 1, wherein the step of contacting the hydrogen sulfide gas with said sodium hydroxide solution comprises spraying said sodium hydroxide solution onto a bed of inert particles and flowing the hydrogen sulfide gas through the bed in countercurrent relation.

6. The process of claim 5 and including the step of collecting the sprayed solution in a trough in said third zone, and agitating said solution in said trough to aid in conversion to said sodium sulfhydrate and/or sodium sulfate.

7. In an apparatus for the removal and recovery of sulfides from tannery waste liquor, a close vessel, means for introducing waste tannery liquor containing sulfide into said vessel, means for reducing the pH of said liquor to a value below 5.5, agitating and conveying means disposed in said vessel for conveying and agitating said liquor, said agitating and conveying means comprising a rotatable shaft and a plurality of conveying discs mounted on said shaft, means for maintaining the liquor in said vessel at a level beneath the upper extremities of said discs, so that the upper portions of said discs are exposed, rotation of said shaft acting to agitate and convey said liquor to release hydrogen sulfide gas from said liquor and coagulate proteinaceous material in said liquor, discharge means for discharging the liquor from said vessel, and means in said vessel for converting said hydrogen sulfide gas to sulfhydrate and/or sulfide.

8. The apparatus of claim 7, wherein said agitating and conveying means also comprises a second shaft disposed in said vessel and located parallel to said first shaft, and a plurality of second conveyor discs mounted on said second shaft and interdigitated with the first discs.

9. A process for treating waste sulfide liquor from a hide tanning operation, comprising the steps of introducing a hide tanning sulfide liquor into a first zone of a closed vessel, adjusting the pH of the liquor to a value less than 5.5 in said first zone, passing the liquor at said pH through a second zone of said vessel to effect release of hydrogen sulfide gas, spraying an aqueous alkali metal hydroxide solution into contact with the hydrogen sulfide gas in a third zone of said vessel to convert said hydrogen sulfide to alkali metal sulfhydrate and/or alkali metal sulfide, collecting the sprayed solution in a trough in said third zone, agitating the solution in said trough to aid in conversion to said alkali metal sulfhydrate and/or alkali metal sulfide, and discharging the alkali metal sulfhydrate and/or alkali metal sulfide from the vessel.

10. The process of claim 9, and including the step of spraying said solution onto a bed of inert particles, and flowing the hydrogen sulfide gas through said bed in countercurrent relation to the spray of said solution.

11. The process of claim 10, wherein said particles comprise three dimensional plastic objects.

12. An apparatus for treating waste sulfide liquor from a hide tanning operation, comprising a closed vessel including a first zone, a second zone, and a third zone, means for introducing tannery waste liquor containing sulfide into said first zone, means or reducing the pH of said liquor in said first zone to a value below 5.5, means for discharging the liquor from said first zone to said second zone, means for continuously advancing the liquor through said second zone to a discharge end of said second to to coagulate proteinaceous materials in said liquor and release hydrogen sulfide to said third zone, said advancing means comprising rotatable conveyor means including a conveyor shaft and a plurality of conveyor discs, said discs being constructed and arranged to convey said liquor towards said discharge end and to agitate said liquor in said second zone, means for discharging said liquor from said discharge end of said second zone, means for contacting said released hydrogen sulfide gas with an alkaline hydroxide solution in said third zone to produce alkaline sulfhydrate and/or alkaline sulfide, and means for discharging said sulfhydrate and/or sulfide from third zone.

13. The apparatus of claim 12, wherein said means for reducing the pH of said liquor comprises means for adding a mineral acid to said liquor.

14. The apparatus of claim 12, wherein said conveyor means comprises a parallel pair of said conveyor shafts and a plurality of said conveyor discs mounted on each of said shafts, the conveyor discs of one conveyor being interdigitated with the conveyor discs of the other conveyor.

15. The apparatus of claim 12, wherein said means for contacting hydrogen sulfide gas with sodium hydroxide solution comprises spray means for spraying said sodium hydroxide solution into the flow path of said gas.

16. The apparatus of claim 15, and including a bed of inert material located within said third zone, said spray means being constructed and arranged to spray said solution into said bed.

17. The apparatus of claim 15, and including vacuum means for drawing a vacuum on said vessel to cause said gas to flow from said second zone to said third zone.

18. A process for treating waste sulfide liquor from a hide tanning operation, comprising the steps of introducing a tannery waste sulfide liquor into a first zone, adjusting the pH of the liquor in said first zone to a value less than 5.5, transferring the liquor from said first zone to a second zone, engaging the liquor in said second zone with a plurality of rotating conveyor discs to agitate and advance said liquor in a downstream direction in said second zone and effect release of hydrogen sulfide gas, maintaining the liquor in said second zone at a predetermined level beneath the upper extremities of said conveyor discs so that the upper portions of said discs are exposed, contacting the released hydrogen sulfide gas in a third zone with an aqueous alkaline solution to form alkali metal sulfhydrate and or alkali metal sulfide, and discharging the alkali metal sulfhydrate and/or alkali metal sulfide from said third zone.

19. An apparatus for treating waste sulfide liquor from a hide tanning operation, comprising a closed vessel including a first zone, a second zone, and a third zone, means for introducing tannery waste liquor containing sulfide into said first zone, means for reducing the pH of said liquor in said first zone to a value below 5.5, means for discharging the liquor from said first zone to said second zone, means for continuously advancing the liquor through said second zone to a discharge end of said second zone to coagulate proteinaceous materials in said liquor and release hydrogen sulfide to said third zone, means for discharging said liquor from the discharge end of said second zone, spray means for spraying an alkaline hydroxide solution into the flow path of said hydrogen sulfide gas in said third zone to produce alkaline sulfhydrate and/or alkaline sulfide trough means disposed in said third zone and disposed to collect the solution being sprayed from said spray means, and means for discharging said sulfhydrate and/or sulfide from said third zone.

20. The apparatus of claim 19, and including agitating means disposed in said trough means for agitating the solution in said trough means.

21. The apparatus of claim 20, wherein said agitating means comprises a shaft and a plurality of conveyor discs mounted on said shaft.

22. The apparatus of claim 21, wherein said trough means comprises a pair of outer parallel trough sections and a central trough section disposed between said outer sections, one end of said central section communicating with corresponding ends of said outer sections, said discharge means being connected to the opposite end of said central section, and said agitating means disposed in each of said trough sections.

* * * * *

UNITED STATES PATENT AND TRADEMARK OFFICE
CERTIFICATE OF CORRECTION

PATENT NO. : 5,328,677
DATED : July 12, 1994
INVENTOR(S) : RICHARD G. WAITE ET AL It is certified that error appears in the above-indentified patent and that said Letters Patent is hereby corrected as shown below:

Col. 9, Line 41, CLAIM 1, Cancel "step" and substitute therefor --steps--; Col. 9, Line 67 CLAIM 4, Cancel "side" and substitute therefor --site--; Col. 10, Line 11, CLAIM 6, Cancel "sulfate" and substitute therefor --sulfide--; Col. 10, Line 13, CLAIM 7, Cancel "close" and substitute therefor --closed--; Col. 10, Line 62, Cancel "or" and substitute therefor --for--; Col. 10, Line 67, CLAIM 12, After "second" insert --zone--; Col. 12, Line 23, CLAIM 19, After "sulfide" insert --,-- (comma)

Signed and Sealed this

Fifteenth Day of November, 1994

Attest:

BRUCE LEHMAN

*Attesting Officer*     *Commissioner of Patents and Trademarks*